United States Patent
Balukin et al.

(12)

(10) Patent No.: US 6,249,722 B1
(45) Date of Patent: Jun. 19, 2001

(54) METHOD OF CONTROLLING BRAKE PIPE PRESSURE

(75) Inventors: Gregory S. Balukin, Pittsburgh, PA (US); Paul J. Kettle, Jr., Ijamsville, MD (US); David J. Pcsolar, Irwin, PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/038,071

(22) Filed: Mar. 11, 1998

(51) Int. Cl.$^7$ .................................. G05D 1/00

(52) U.S. Cl. .................. 701/19; 701/70; 301/15; 301/20

(58) Field of Search .............. 701/70, 19; 246/182; 303/3, 15, 20

(56) References Cited

U.S. PATENT DOCUMENTS

| | | | |
|---|---|---|---|
| 4,904,027 | * 2/1990 | Skantar et al. | 303/15 |
| 5,172,316 | * 12/1992 | Root et al. | 701/19 |

* cited by examiner

Primary Examiner—William A. Cuchlinski, Jr.
Assistant Examiner—Arthur D Donnelly
(74) Attorney, Agent, or Firm—James Ray & Associates

(57) ABSTRACT

An improved method is used to control the pressure in the brake pipe of a train. The train is equipped with an automatic brake handle, an equalizing reservoir, a brake pipe control device and a computer for controlling the control device according to position of the handle. The method involves the steps of: moving the handle to a point along its range of motion; and storing in the computer as a setpoint the value desired for the pressure in the brake pipe. At whichever point the handle occupies along its range of motion, there is a particular pressure setpoint corresponding thereto. The method next includes the steps of: directing the computer to command the control device to modify the actual pressure in the equalizing reservoir to the setpoint thereby also causing the actual brake pipe pressure to approach the setpoint. As the actual brake pipe pressure approaches the setpoint, the computer is directed to command the control device to adjust the actual equalizing reservoir pressure to a value slightly above (if desiring to increase brake pipe pressure) or below (if desiring to decrease brake pipe pressure) the setpoint until the actual brake pipe pressure reaches the setpoint. While monitoring the actual brake pipe pressure, the computer then commands the control device to adjust the actual equalizing reservoir pressure to maintain the actual brake pipe pressure at the setpoint corresponding to position of the brake handle.

20 Claims, 4 Drawing Sheets

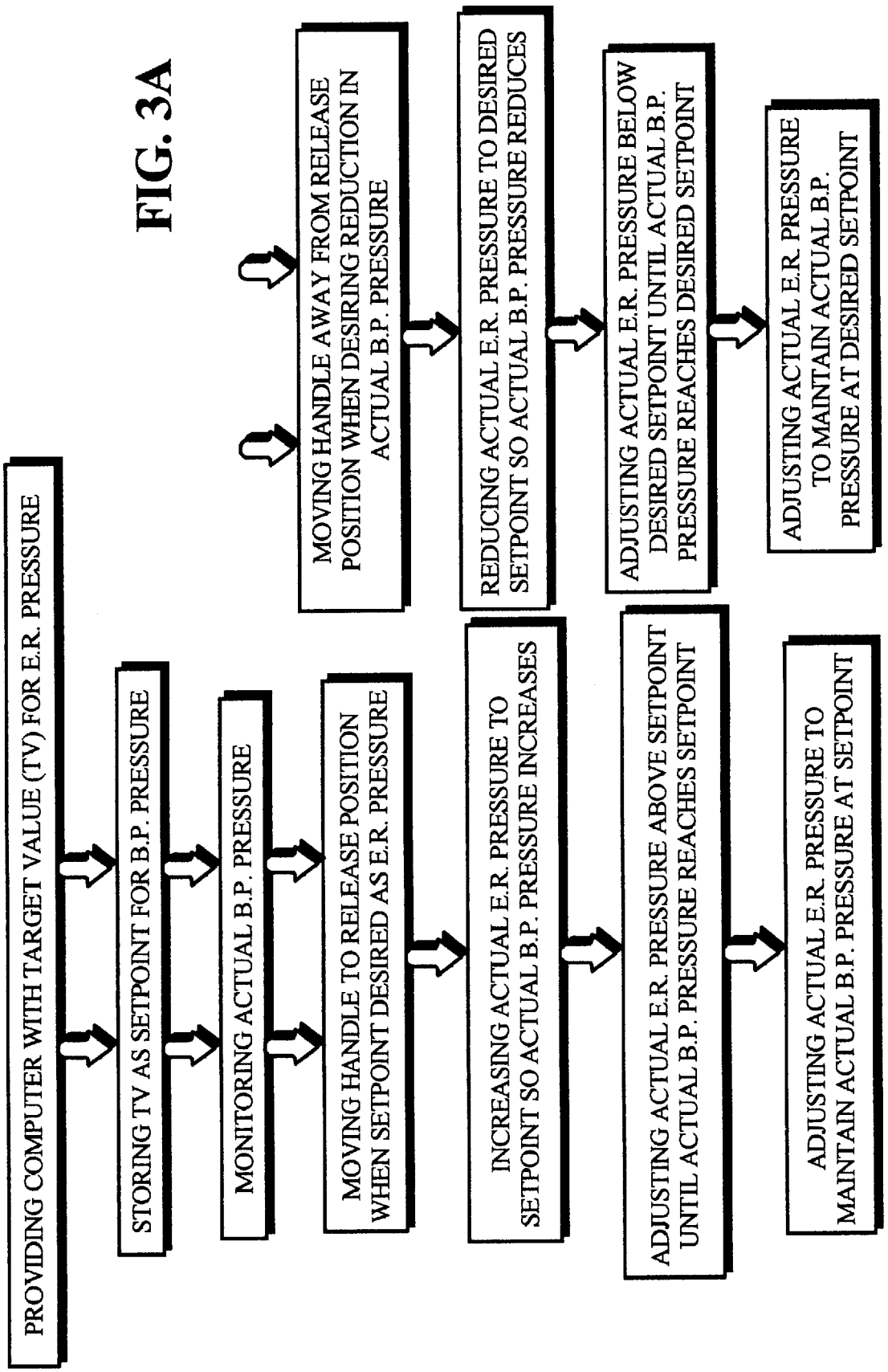

METHOD OF CONTROLLING BRAKE PIPE PRESSURE

FIELD OF THE INVENTION

The present invention generally relates to brake control equipment for a train. More particularly, the present invention pertains to an improved method of controlling the pressure within the brake pipe of a train.

BACKGROUND OF THE INVENTION

A typical train includes one or more locomotives, a plurality of railcars and several trainlines. The trainlines include both pneumatic and electrical lines most of which run from the lead locomotive to the last railcar in the train. One pneumatic trainline is the brake pipe. The brake pipe consists of a series of individual pipe lengths each of which is secured to the underside of one railcar. Each pipe length is interconnected to another such pipe length via a flexible coupler situated between each railcar. Usually controlled so as to mimic the pressure contained in a storage tank called the equalizing reservoir, the brake pipe is thus one long continuous pipe that runs essentially from the lead locomotive to the last railcar. This pipe conveys the pressurized air that is required by the brake control system to charge the various reservoirs and operate the brake control valves of each railcar in the train.

In a locomotive, the pneumatic trainlines include an actuating pipe, a main reservoir equalizing (MRE) pipe, and an independent application and release (IAR) pipe, in addition to the brake pipe. Within a locomotive consist (i.e., two or more locomotives connected together), the MRE, actuating and IAR pipes of each locomotive connect to the MRE, actuating and IAR pipes of adjacent locomotives. The IAR pipe supplies the compressed air that may be used to control the delivery of pressurized air to, and thus to operate, the air brakes of each locomotive in the train.

The brakes of a train, whether on railcars or locomotives, are applied using brake cylinders and associated components. During braking, the brake cylinders convert the pressurized air that they receive to mechanical force. From the brake cylinders this force is transmitted by mechanical linkage to the brake shoes. When the brakes are applied, it is the brake shoes that are ultimately used to slow or stop the rotation of the wheels on every vehicle in the train.

A typical locomotive has a brake control system such as any one of the various EPICS Brake Equipment Systems produced by the Westinghouse Air Brake Company (WABCO). These brake control systems generally include a cab station unit, a keyboard, a display, a locomotive interface unit, a brake control computer and a pneumatic operating unit. The cab station unit generates various signals including those representing the positions of the automatic and independent brake handles, and conveys commands corresponding thereto to the brake control computer. The keyboard also permits a train operator to access the brake equipment, allowing, for example, the operator to input certain set-up parameters. The display allows the operation of the brake equipment to be monitored. The locomotive interface unit (LIU) connects electrical power and certain trainlines to the brake equipment and provides various signals to the brake control computer. Based on the inputs it receives and the software that dictates its operation, the brake control computer essentially controls the overall operation of the brakes. Shown in FIG. 1, the pneumatic operating unit (POU) controls the pressures in the pneumatic trainlines and in various reservoirs so as to control the brakes according to commands received from the brake control computer.

The POU features a pneumatic laminate to which the brake control computer and various pneumatically and electropneumatically operated devices mount. The design of the laminate allows these components to be removed for repair and maintenance without disturbing the piping or wiring of the locomotive. Through a number of ports and internal passages, the pneumatic laminate interconnects these devices to each other and to branch pipes that carry air from or to the actuating pipe, the MRE pipe, the IAR pipe, the brake pipe, the brake cylinder and/or various storage tanks such as the equalizing reservoir. It is through the ports and internal passages of the pneumatic laminate that these devices communicate fluidly with each other and the pneumatic pipes on the train.

Among the devices mounted to the laminate are the independent application and release (IAR) portion, the brake cylinder (BC) control portion and the brake pipe (BP) control portion shown in FIG. 1. These operating portions of the POU are primarily controlled by the brake control computer. The IAR portion features pneumatic logic circuitry along with solenoid operated valves by which the pressure in both the actuating and IAR pipes can be controlled. The BC control portion also features pneumatic logic circuitry along with solenoid operated valves by which the pressure in the brake cylinders on the locomotive can be controlled. The BC control portion controls the pressure in the locomotive brake cylinders in response to the commands generated by movement of either of the two brake handles. These automatic and independent brake demand signals may also be generated by pressure changes in the brake pipe, the IAR pipe, the back-up brake or the penalty brake circuitry. The BP control portion uses pneumatic logic circuitry and solenoid operated valves by which the pressure in the equalizing reservoir and thus the brake pipe of the train can be controlled. Shown in FIG. 2, the BP control portion also controls the emergency venting and brake pipe cut-off functions.

The cab station unit generally includes a handle unit and a cab control unit. The handle unit houses the two brake handles and related components. The cab control unit essentially has a computer and a cab interface card. From the handle unit the cab control computer receives via the interface card the signals indicative of the positions of the automatic and independent brake handles. Based on these inputs, the cab control computer calculates commands representative of how much, or even if, the braking effort should be reduced. Along with other information, the cab control computer then conveys these commands to the brake control computer.

The automatic brake handle is the device that the train operator can manipulate to direct the brake equipment to apply and release the brakes on each locomotive and each railcar of the train. The level to which the brake equipment reduces or increases pressure within the brake pipe, and thus the amount of braking power exerted by the train brakes, corresponds to the position of the automatic brake handle. The independent brake handle, in contrast, allows the train operator to apply and release the brakes only on the locomotives of the train.

The independent brake handle may be moved between and placed within any of two positions. When the independent brake handle is moved to its apply position, the brake control computer commands the IAR portion to increase pressure within the IAR pipe. The BC control portion responds pneumatically to this increase in IAR pipe pressure by directing air from the main reservoir to the brake cylinders of the locomotive to apply fully the locomotive brakes.

Similarly, when the independent brake handle is moved to its release position, the brake control computer commands the IAR portion to reduce pressure within the IAR pipe. Responding pneumatically to the decrease in IAR pipe pressure, the BC control portion now vents air from the brake cylinders to release the locomotive brakes. Pressure in the IAR pipe and the locomotive brake cylinders reduces and increases in proportion to the position of the independent brake handle.

The automatic brake handle can be moved from and in between a release position at one extreme in which brake pipe pressure is maximum and the brakes are completely released to an emergency position at another extreme in which brake pipe pressure is zero and the brakes are fully applied. When the brakes are applied, reduction of the pressure in the brake pipe is generally controlled from the lead locomotive via the BP control portion. The exact amount by which the pressure is reduced depends into which of the application positions the brake handle is placed. It is this reduction in pressure that signals the brake control valve(s) on each railcar to supply pressurized air from the appropriate reservoir(s) to the brake cylinders to apply the railcar brakes. The automatic brake handle positions include release, minimum service, full service, suppression, continuous service and emergency. Between the minimum and full service positions lies the service zone wherein each incremental movement of the handle toward the full service position causes an incremental reduction in brake pipe pressure.

When the automatic brake handle is moved to its release position, the brake control computer commands the BP control portion to increase pressure within the equalizing reservoir and thus the brake pipe. Specifically, the equalizing reservoir fully charges to the setup/target value appropriate to the type of train (passenger or freight) at issue. The pressure within the brake pipe approaches close to this target pressure, but due to the mechanical nature of the BP control portion cannot achieve it. Nevertheless, the brake control valves on each railcar respond pneumatically to this high brake pipe pressure by venting the air from the brake cylinders thereby completely releasing the railcar brakes. The BC control portion also responds pneumatically to the increase in brake pipe pressure by venting air from the brake cylinders of the locomotive. Moving the automatic brake handle to its release position also causes the brake control computer to command electrically the solenoid valves of BC control portion to depressurize the locomotive brake cylinders. The BC control portion thus can release the locomotive brakes by responding to either electrical commands or pneumatic commands or both, the former issued by the brake control computer and the latter being the increase in brake pipe pressure.

When the automatic brake handle is moved to its minimum service position, the brake control computer commands the BP control portion to reduce pressure within the equalizing reservoir by approximately 6 to 7 psi, irrespective of the brake pipe pressure. This prepares the brake control system for a somewhat quicker application of the train brakes than would be possible from the release position. Moving the automatic brake handle into the service zone even up to the full service position causes the BP control portion to reduce further the pressure in the equalizing reservoir, though in a manner corresponding to handle position. The BP control portion reduces the brake pipe pressure accordingly thereby enabling the brake control valves on the railcars to apply the railcar brakes. Meanwhile, pressure transducers provide electrical signals indicative of the current pressures in the equalizing reservoir and brake pipe to the brake control computer. Based in part on these signals, the brake control computer then commands the BC control portion to direct air from the main reservoir to the locomotive brake cylinders to apply the locomotive brakes.

Moving the automatic brake handle beyond the full service position toward the suppression position causes no additional reduction in the pressure in the equalizing reservoir or brake pipe. When the automatic brake handle is moved beyond the suppression position, the BP control portion reduces the equalizing reservoir pressure at a service rate that corresponds approximately to handle position. Placing the automatic brake handle in the continuous service position causes the equalizing reservoir to reduce to zero at a service rate. Moving the automatic brake handle back into the service zone causes the BP control portion to assume a lap state in which the pressure within the equalizing reservoir and brake pipe is held at the existing level. The BC control portion also can assume a lap state in which the pressure in the locomotive brake cylinders can be maintained at the current pressure level.

When the automatic brake handle is moved into the emergency position, the brake equipment energizes two emergency magnet valves located in the BP control portion. Described in greater detail below, one emergency magnet valve is energized by the brake control computer whereas the other emergency magnet valve is energized directly by a microswitch that closes when the automatic brake handle is moved into its emergency position. Through these two emergency magnet valves, the BP control portion vents the brake pipe to atmosphere at an emergency rate so as to apply the train brakes quickly and fully.

The keyboard allows the train operator to input the various parameters necessary to set-up the brake equipment for operation. For example, the train operator must enter the aforementioned equalizing reservoir target pressure appropriate to the type of train at issue: typically 90 psi for a freight train and 110 psi for a passenger train.

Through the keyboard, the train operator also selects the mode in which the locomotive brake equipment will be operated. In the LEAD CUT-IN mode, the brake control computer permits the locomotive operator to direct control of the train through both the automatic and the independent brake handles. This gives the operator control over the brakes of both the locomotive(s) and the railcars. In the LEAD CUT-OUT mode, the brake control computer permits the locomotive operator to direct control only through the independent brake handle. This gives the operator control over the brakes of the locomotive(s) only. In the TRAIL mode, both brake handles are rendered inoperable except for the emergency position. In a locomotive consist, the brake equipment of one locomotive operating in the TRAIL mode is essentially subservient to the brake equipment of another locomotive operating in either of the LEAD modes. The operation of the BP control portion is affected by the mode in which the locomotive is operated.

The foregoing background information is provided to assist the reader to understand the invention described and claimed below. Accordingly, any terms used herein are not intended to be limited to any particular narrow interpretation unless specifically stated otherwise in this document.

OBJECTIVES OF THE INVENTION

It is, therefore, a primary objective of the invention to provide an improved method of controlling the pressure within the brake pipe of a train without requiring the use of additional hardware.

Another objective of the invention is control the pressure within the brake pipe of a train in such a way as to eliminate reliance on a pressure differential developed across a diaphragm of a pneumatic valve as is common with currently known methods of controlling brake pipe pressure.

Yet another objective of the invention is to modify the algorithm executed by the brake control computer so that the computer can use feedback of the actual brake pipe pressure to control pressure within the brake pipe better than currently known methods of controlling brake pipe pressure.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the following drawings and claims.

SUMMARY OF THE INVENTION

The invention provides a method of controlling pressure within a brake pipe of a train. In a presently preferred embodiment, the method comprises the following steps: providing a computer with a target value for pressure within an equalizing reservoir; and storing the target value in the computer as a setpoint for pressure within the brake pipe. The computer via a transducer is typically used to monitor the actual pressure in the brake pipe. When the brake handle is placed in its release position, the method includes the steps of: directing the computer to increase the actual pressure in the equalizing reservoir to the setpoint thereby causing the actual brake pipe pressure to increase; and, as the actual brake pipe pressure approaches the setpoint, directing the computer to adjust the actual equalizing reservoir pressure to a value slightly above the setpoint until the actual brake pipe pressure reaches the setpoint. Then, while monitoring the actual brake pipe pressure, the computer is directed to adjust the actual equalizing reservoir pressure to maintain the actual brake pipe pressure at the setpoint. When a reduction in brake pipe pressure is desired, the method includes the steps of: moving the brake handle until a value desired for the equalizing reservoir pressure showing in the equalizing reservoir field of a display is at a desired setpoint; and directing the computer to reduce the actual pressure in the equalizing reservoir to the desired setpoint thereby causing the actual pressure in the brake pipe to reduce. Next, as the actual brake pipe pressure approaches the desired setpoint, the computer is directed to adjust the actual equalizing reservoir pressure to a value slightly below the desired setpoint until the actual brake pipe pressure reaches the desired setpoint. Then, while monitoring the actual brake pipe pressure, the computer is directed to adjust the actual equalizing reservoir pressure to maintain the actual pressure in the brake pipe at the desired setpoint.

BRIEF DESCRIPTION OF THE DRAWINGS

FIGS. 3A and 3B depict a block diagram that illustrates in step wise fashion, according to the present invention, an improved method for controlling brake pipe pressure on a train.

DETAILED DESCRIPTION OF THE INVENTION

Figure 1:
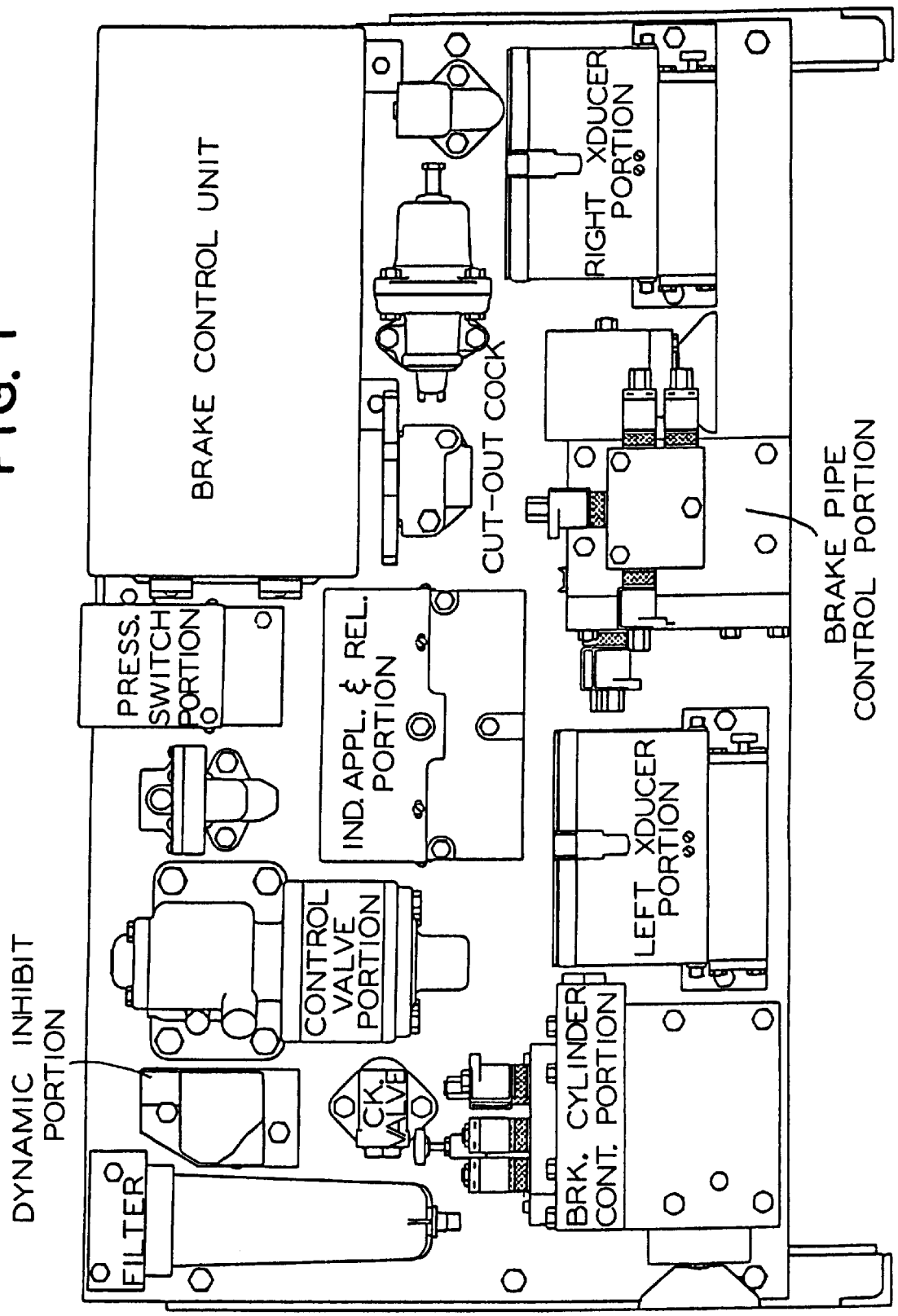
FIG. 1 is a front view of a pneumatic operating unit showing a brake control computer and a brake pipe control portion whose operation the brake control computer controls.

Before describing the invention in detail, the reader is advised that, for the sake of clarity and understanding, where possible identical components having identical functions have been marked with the same reference numerals in each of the Figures provided in this document.

Figure 2:
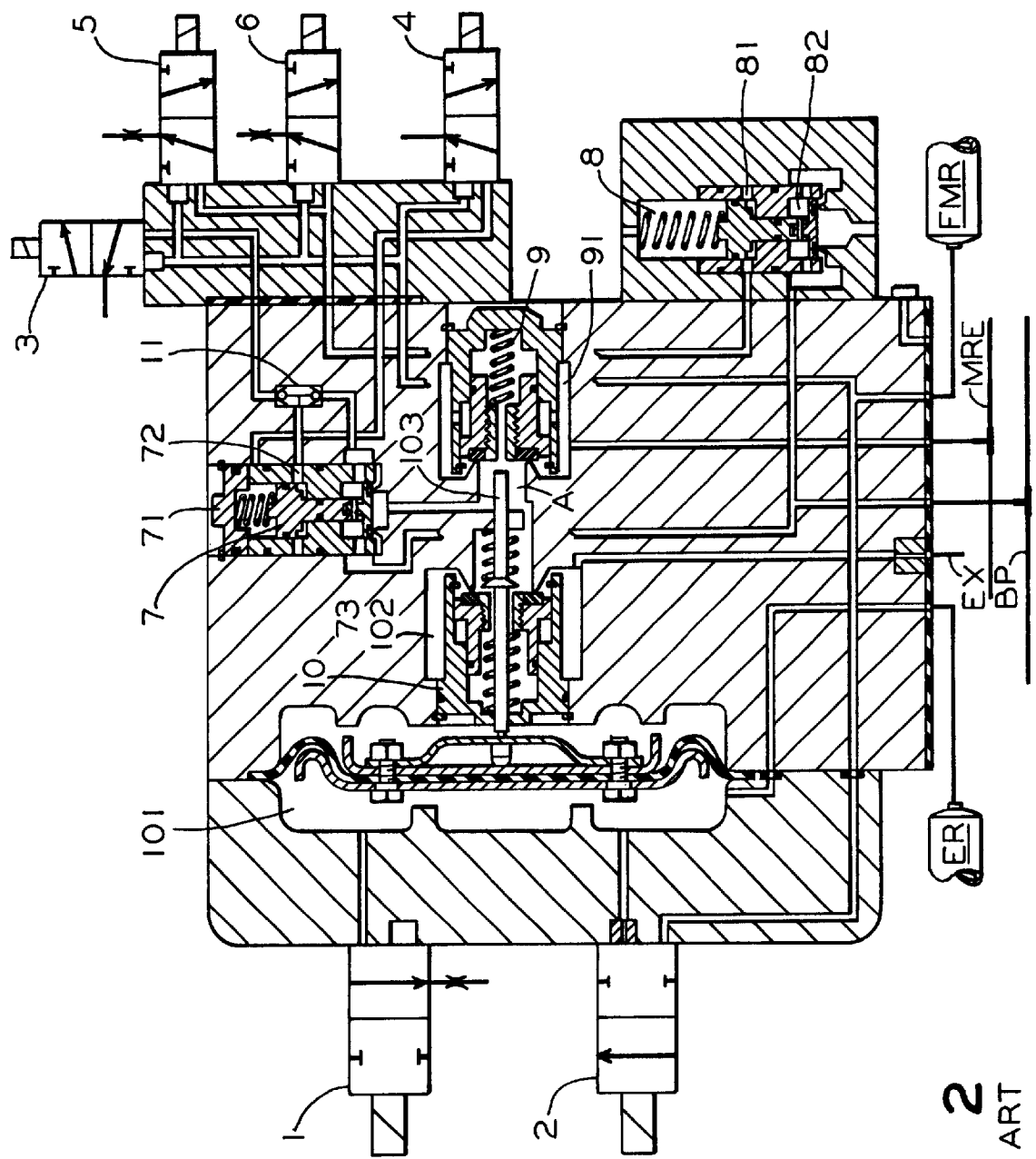
FIG. 2 is a cross sectional view of a prior art brake pipe control portion.

FIG. 2 illustrates a brake pipe (BP) control portion of a pneumatic operating unit through which to control the pressure within the brake pipe throughout a train. This BP control portion is a known device whose construction and operation is shown and explained in Operation & Maintenance Manual Document No. 4208-32, Rev. Date August 1996, published by WABCO and incorporated herein by reference.

The BP control portion typically employs six magnet valves and four pneumatic valves. The magnet valves include application and release magnet valves 1 and 2, cut-in and cut-out magnet valves 3 and 4 and two emergency magnet valves 5 and 6. The pneumatic valves include a charging cut-off valve 7, an emergency vent valve 8, a supply valve 9 and an exhaust valve 10. It is through these pneumatic valves, as controlled by the magnet valves, that air is supplied to or vented from the brake pipe of the train.

Among other internal pneumatic routes, the BP control portion defines several passages as shown in FIG. 2. Best described in terms of networks, these passages include a primary passage network and a control passage network. As described in greater detail below, the primary passage network is essentially a web of interconnected passages that is used to interconnect the brake pipe BP to certain chambers of the pneumatic valves. Similarly, the control passage network is used to interconnect the magnet valves to a source of control pressure such as the filtered air supplied by the main reservoir (FMR) of the locomotive. (As alluded to in the background section of this document, the BP control portion itself does not directly connect to the named pneumatic pipes and reservoirs of the train. Only indirectly—through the ports and internal passages of the pneumatic laminate and various branch pipes leading thereto—does the BP control portion communicate fluidly with the named pneumatic pipes and reservoirs.)

The aforementioned magnet valves are each two-position magnet valves controlled by either the brake control computer (not shown) or other known control components. The application magnet valve (AMV) 1 connects at its exhaust port to atmosphere and at its output port to the equalizing reservoir (ER) control chamber 101 located adjacent the underside of the diaphragm operated exhaust valve 10. The release magnet valve RMV, 2 connects at its input port to the filtered main reservoir (FMR) via the control passage network and at its output port to the ER control chamber 101. The cut-in magnet valve (CIMV) 3 connects at its input port to the control passage network and at its output port to a first inlet of double check valve 11. The cut-out magnet valve (COMV) 4 connects at its input port to the control passage network and at its output port to a closing chamber 71 of charging cut-off valve 7. The first emergency magnet valve (EMV1) 5 connects at its input port to the control passage network and at its output port to an opening chamber 81 of emergency vent valve 8. Likewise, the second emergency magnet valve (EMV2) 6 connects at its input port to the control passage network and at its output port to the opening chamber 81 of emergency vent valve 8.

Regarding the operation of the BP control portion when the train operator chooses to operate the locomotive in the LEAD CUT-IN mode, the brake control computer energizes the CIMV 3 and deenergizes the COMV 4. The COMV 4 via its output port then allows closing chamber 71 of charging cut-off valve 7 to vent to atmosphere. Meanwhile, the CIMV 3 allows FMR air via the control passage network to flow to the first inlet of double check valve 11. Air from the brake pipe BP is also able to flow through the primary passage network through vent chamber 73 of charging cut-off valve 7 to the second inlet of double check valve 11. Whichever of the FMR and BP air streams exhibits the greater pressure, double check valve 11 directs the higher pressure air through its outlet to the opening chamber 72 of charging cut-off valve 7. If this pressure is sufficient to overcome the spring bias of charging cut-off valve 7, valve 7 assumes the cut-in position (not shown) in which the brake pipe BP via the primary passage network and vent chamber 73 is in communication with intermediate chamber A situated between the supply and exhaust valves 9 and 10.

When the automatic brake handle is moved to its release position, the brake control computer energizes both the AMV 1 and the RMV 2. The AMV 1 in its energized state disconnects its output port from its exhaust port thereby preventing air in the ER control chamber 101 from escaping to atmosphere. Meanwhile, the RMV 2 allows FMR air via the control passage network to flow into the ER control chamber 101 of exhaust valve 10. Consequently, as pressure builds in the ER control chamber 101, the pressure builds in the equalizing reservoir (ER) to the setup/target pressure via the ER pipe. This pressure build up causes the exhaust valve 10 to move further to the right so as to unseat via valve stem 103 supply valve 9. Air from the MRE pipe of the locomotive is then able to flow through supply chamber 91 of supply valve 9 through chamber A and into charging cut-off valve 7. As the locomotive is operating in the LEAD CUT-IN mode, valve 7 is open so the air from the MRE pipe continues flowing through vent chamber 73 via the primary passage network into the brake pipe BP. Pressure in the brake pipe thus rises along with the pressure in the equalizing reservoir.

Responding pneumatically to the resulting increase in brake pipe pressure, the brake control valves on each railcar then vent air from the brake cylinders to release completely the railcar brakes. As described earlier, the BC control portion also releases the locomotive brakes by responding both pneumatically to the increase in brake pipe pressure and electrically (via solenoid operated valves) to the ensuing commands issued by the brake control computer.

Should the automatic brake handle then be moved into its full service position or any other position between minimum and continuous service, the brake control computer deenergizes both the AMV 1 and the RMV 2. The AMV 1 in its deenergized state connects its output port to its exhaust port thereby allowing air in the ER control chamber 101 to escape to atmosphere. Meanwhile, the RMV 2 disconnects its input port from its output port thereby preventing FMR air via the control passage network from flowing into the ER control chamber 101. Consequently, as pressure drops in the ER control chamber 101, the pressure drops in the equalizing reservoir via the ER pipe. This pressure drop causes the exhaust valve 10 to move back to the left so as to seat supply valve 9 (shown) and unseat itself (not shown). With supply valve 9 closed, this prevents air from the MRE pipe from flowing through supply chamber 91 of supply valve 9 into chamber A. With exhaust valve 10 open, air is able to flow from the brake pipe via the primary passage network into vent chamber 73 of charging cut-off valve 7. The air from the brake pipe continues flowing through intermediate chamber A and exhaust chamber 102 to atmosphere via exhaust port EX of the BP control portion. Pressure in the brake pipe thus drops along with the pressure in the equalizing reservoir.

Responding pneumatically to the resulting decrease in brake pipe pressure, the brake control valves on each railcar then supply pressurized air from the appropriate reservoirs to the brake cylinders to apply the railcar brakes. Specifically, for passenger transit railcars, reducing brake pipe pressure from 110 to 100 psi causes brake cylinder pressure to rise approximately 25 psi. Dropping brake pipe pressure further, say, from 100 to 90 psi, will cause brake cylinder pressure to rise another 25 psi. For freight transit railcars, dropping brake pipe pressure from 90 to 80 psi, and again from 80 to 70 psi, causes similar rises in brake cylinder pressure. As described earlier, pressure transducers provide signals indicative of the current pressures in the equalizing reservoir and brake pipe to the brake control computer. Based in part on these signals, the brake control computer then commands the BC control portion to direct air (via solenoid operated valves) from the main reservoir to the locomotive brake cylinders to apply the locomotive brakes.

When the equalizing reservoir pressure has reached the level corresponding to the position of the automatic brake handle, or upon moving the handle back into the service zone from the continuous service position, for example, causes the brake control computer to reenergize the AMV 1. The AMV 1 thus again disconnects its output port from its exhaust port thereby preventing air in the ER control chamber 101 from escaping to atmosphere. The RMV 2, still deenergized, prevents FMR air via the control passage network from flowing into the ER control chamber 101. Consequently, the pressure is held constant in ER control chamber 101 as well as in the equalizing reservoir via the ER pipe. Exhaust valve 10 remains open as long as the pressure of the air flowing from the brake pipe BP (via the primary passage network, vent chamber 73, chamber A and exhaust chamber 102 to the exhaust port EX) overcomes the opposing bias of exhaust valve 10. The overall bias of the exhaust valve 10, however, is selected so that the exhaust valve 10 closes once the brake pipe pressure drops to match that in the equalizing reservoir. The BP control portion thus assumes a lap state in which the pressure within the equalizing reservoir and brake pipe is held at the existing level.

Responding to this constant brake pipe pressure, the brake control valves on each railcar also assume a lap state in which the force with which the railcar brakes are applied is held constant. The BC control portion follows by assuming a lap state in which the pressure in the locomotive brake cylinders is also held at the then existing pressure level.

When the automatic brake handle is moved from within the service zone or above towards the release position, the way in which the brakes operate depends on whether the brake equipment has been designed to allow a graduated release of the brakes. Passenger trains typically feature brake equipment that allows a graduated release of the brakes whereas freight train brake equipment typically permits only a direct release.

For direct release equipment, in response to such movement of the brake handle, the brake control computer does not command the BP control portion to increase the pressure in the equalizing reservoir (via ER control chamber 101 and the ER pipe) until the automatic brake handle is placed in the release position. Pressure in the brake pipe follows this rise in equalizing reservoir pressure as noted earlier. Once the pressure in the brake pipe increases greater than approximately 2 psi, however, the BC control portion and the railcar brake control valves respond by completely venting the brake cylinders thereby fully releasing the train brakes.

For graduated release equipment, in response to such movement of the brake handle toward the release position, the brake control computer commands the BP control portion to increase the pressure in the equalizing reservoir incrementally. The level to which the equalizing reservoir pressure rises is dependent on the extent to which the handle is moved toward the release position. Pressure in the brake pipe, of course, follows this rise in equalizing reservoir pressure. Unlike the BC control portion and brake control valves typically found on freight trains, those on passenger trains are designed to react to this incremental rise in brake pipe pressure by reducing proportionately the pressure in the brake cylinders thereby reducing the force with which the train brakes are applied.

Should the automatic brake handle at any time be moved into its emergency position, the BP control portion is controlled in essentially the same way as it is when the automatic brake handle is placed in its continuous service position. In addition, the cab control computer conveys to the brake control computer the emergency command, i.e., the signal indicating that the automatic brake handle has been placed in the emergency position. The brake control computer responds by immediately energizing the EMV1 5. The EMV1 5 in its energized state connects its input and output ports thereby allowing FMR air via the control passage network to flow to the opening chamber 81 of emergency vent valve 8. Placing the automatic brake handle into its emergency position also closes a microswitch (not shown). When closed, the microswitch energizes the EMV2 6. Like the EMV1, the EMV2 6 in its energized state connects its input and output ports thereby allowing FMR air via the control passage network to flow to the opening chamber 81 of emergency vent valve 8. This quick pressure build up in opening chamber 81 causes the emergency vent valve 8 to open thereby venting the brake pipe pressure to atmosphere. During an emergency, the BP control portion thus responds by dropping the brake pipe pressure at an emergency rate.

Responding pneumatically to the precipitous drop in brake pipe pressure, the brake control valves on each railcar quickly supply pressurized air to the brake cylinders thereby applying the railcar brakes. The BC control portion responds as well by directing air from the main reservoir to the locomotive brake cylinders thereby quickly applying the locomotive brakes.

Regarding the operation of the BP control portion when the train operator chooses to operate the locomotive in the LEAD CUT-OUT mode, the brake control computer deenergizes the CIMV 3 and energizes the COMV 4. The CIMV 3 in its deenergized state connects its output port to its exhaust port thereby venting the first inlet of double check valve 11 to atmosphere. The opening chamber 72 of charging cut-off valve 7 thus receives air from the brake pipe BP (via the second inlet of double check valve 11, vent chamber 73 and the primary passage network). Meanwhile, the COMV 4 connects its input and output ports thereby allowing FMR air via the control passage network to flow to the closing chamber 71 of charging cut-off valve 7. Along with the spring bias of charging cut-off valve 7, the pressure exhibited by FMR air stream forces charging cut-off valve 7 to close. Charging cut-off valve 7 thus assumes the cut-out position, as shown in FIG. 2, in which the brake pipe BP no longer communicates with chamber A situated between the supply and exhaust valves 9 and 10.

Operating the locomotive in the LEAD CUT-OUT mode prevents the BP control portion from affecting the pressure within the brake pipe as long as the automatic brake handle lies outside of its emergency position. Because the charging cut-off valve 7 is closed when the locomotive is operating in the LEAD CUT-OUT mode, the brake pipe BP cannot communicate with chamber A situated between the supply and exhaust valves 9 and 10. Consequently, the brake pipe BP can neither be exhausted (via exhaust port EX) nor charged (via the MRE pipe connection). Moving the automatic brake handle anywhere between and including the release and the continuous service positions thus has no effect on the pressure within the brake pipe.

When the automatic brake handle is moved into the emergency position, the BP control portion will affect brake pipe pressure even though its charging cut-off valve 7 is in the cut-out position. As alluded to previously, the cab control computer conveys to the brake control computer the emergency command. The brake control computer responds by immediately energizing the EMV1 5. Moving the automatic brake handle into the emergency position also closes the microswitch thereby energizing the EMV2 6. The EMV1 5 and EMV2 6 in their energized states each connects its input and output ports thereby allowing FMR air via the control passage network to flow to the opening chamber 81 of emergency vent valve 8. The pressure build up in opening chamber 81 causes the emergency vent valve 8 to open thereby venting the brake pipe pressure to atmosphere.

Responding pneumatically to the precipitous drop in brake pipe pressure, the brake control valves on each railcar quickly supply pressurized air to the brake cylinders thereby applying the railcar brakes. The BC control portion responds as well by directing air from the main reservoir to the locomotive brake cylinders thereby quickly applying the locomotive brakes.

The construction and operation of the BP control portion has been described herein to the extent necessary to understand the environment in which the present method invention will be used. It should be understood, however, that this constitutes a brief and simplified explanation of how this operating portion works. A more detailed explanation of the operation of the BP control portion can be found in the aforementioned Operation & Maintenance Manual Document published by WABCO, previously incorporated herein by reference.

It is apparent that the foregoing is illustrative of a method of controlling brake pipe pressure that relies upon development of a pressure differential across the diaphragm of exhaust valve 10. Specifically, the BP control portion and the brake control computer that controls it use the pressure in the equalizing reservoir to control the pressure within the brake pipe. As noted earlier, the setup pressure for the equalizing reservoir (corresponding to the release of railcar brakes) is entered by the train operator upon system startup. Thereafter, whenever the automatic brake handle is moved, the brake control computer derives a new target pressure for the equalizing reservoir that corresponds to handle position. The brake control computer then actuates the appropriate magnet valve(s) of the BP control portion to bring the pressure in the equalizing reservoir to the new target level. The computer receives from a transducer the current equalizing reservoir pressure which it uses to maintain the equalizing reservoir at the target pressure appropriate for the given handle position.

This target pressure, of course, is applied to the ER control chamber 101 against the diaphragm of exhaust valve 10 where it acts as a reference pressure for the brake pipe. As alluded to previously, movement of the diaphragm allows the exhaust valve 10 to assume any one of three states: (1) the exhaust state in which the brake pipe can vent to atmosphere, (2) the supply state in which FMR air can charge the brake pipe, and (3) the lap state in which communication to both FMR air and atmosphere is closed thereby holding the equalizing reservoir at the then applicable target pressure. The pressure within the brake pipe approaches this target pressure, but due to the mechanical nature of the BP control portion cannot achieve it. Consequently, there is always a difference between the pressure in the equalizing reservoir and that in the brake pipe.

Figure 3B:
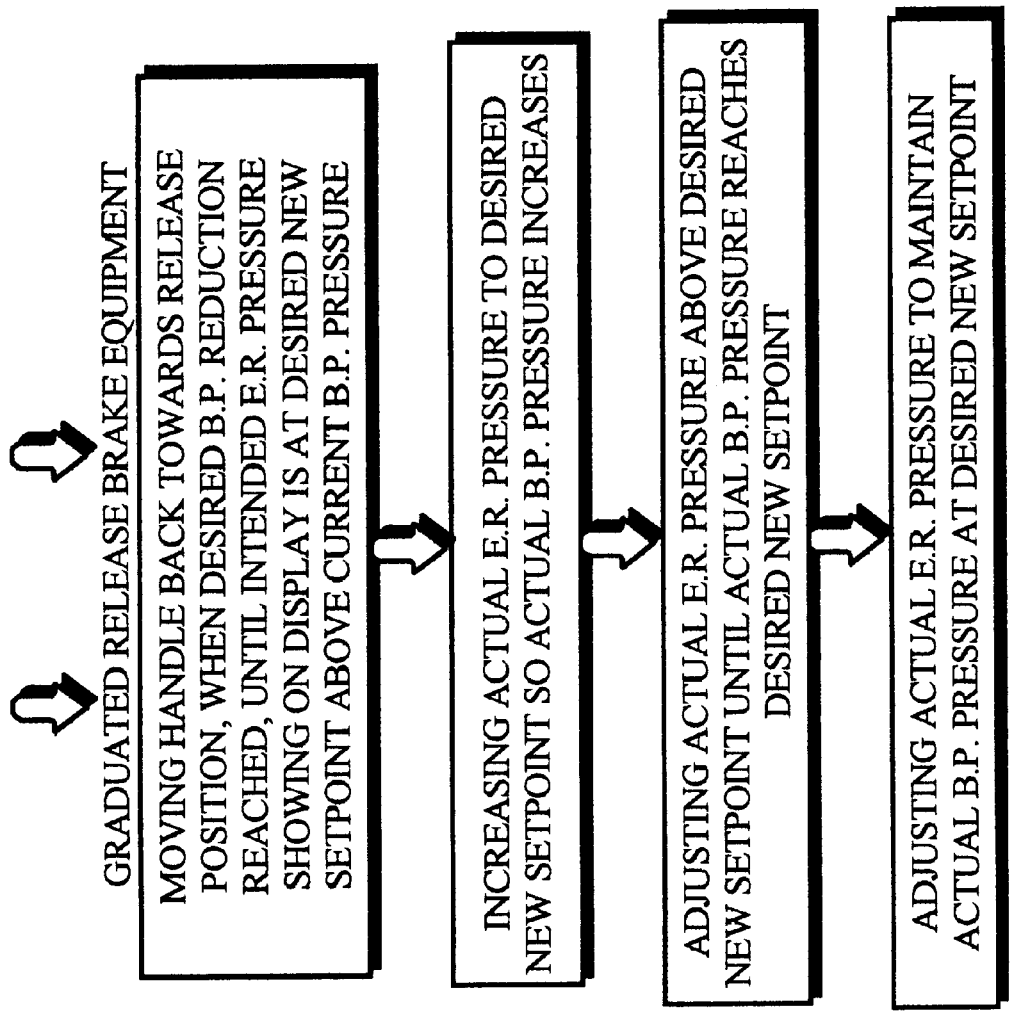

FIGS. 3A and 3B illustrate an improved method for controlling brake pipe pressure that can be employed with any of the aforementioned EPIC® Brake Equipment Systems. Referring to the BP control portion described above as well as planned improvements or variations thereto, this new method eliminates reliance on developing the pressure differential across the diaphragm of exhaust valve 10.

Comprised of several steps, the improved method of controlling brake pipe pressure involves using the brake control computer and the BP control portion under its control. When entering the parameters during the initial set-up of the brake equipment, the train operator provides the computer with the target value for the pressure in the equalizing reservoir for a release of the brakes. Typically, the target value is 90 psi for a freight train and 110 psi for a passenger train. This target value is stored in the computer as a setpoint for the pressure in the brake pipe. The computer via a transducer is typically used to monitor the actual pressure in the brake pipe.

When the automatic brake handle is placed within the release position, the method includes the following steps, preferably performed in the order listed below. The brake control computer is directed to set the pressure within the equalizing reservoir equal to the setpoint. The computer commands the BP control portion to increase the actual pressure within the equalizing reservoir to the setpoint thereby causing the actual pressure in the brake pipe to increase. As the actual brake pipe pressure approaches the setpoint, the computer is directed to command the BP control portion to adjust the actual equalizing reservoir pressure to a value slightly above the setpoint until the actual brake pipe pressure reaches the setpoint. As the computer monitors the actual brake pipe pressure, the computer is directed to command the BP control portion to adjust the actual equalizing reservoir pressure to maintain the actual brake pipe pressure at the setpoint. Even though the equalizing reservoir pressure is actually slightly higher, the display is then directed to indicate the setpoint as the current pressure within the equalizing reservoir.

When a reduction in brake pipe pressure is desired, the method includes the following steps, preferably performed in the order set forth below. The train operator moves the brake handle until a value desired for the equalizing reservoir pressure showing in the equalizing reservoir field of the display is at a desired setpoint. Meanwhile, the brake control computer is directed to command the BP control portion to reduce the actual pressure within the equalizing reservoir to the desired setpoint thereby causing the actual pressure in the brake pipe to reduce. As the actual brake pipe pressure approaches the desired setpoint, the computer is directed to command the BP control portion to adjust the actual pressure in the equalizing reservoir to a value slightly below the desired setpoint until the actual brake pipe pressure reaches the desired setpoint. As it monitors the actual brake pipe pressure, the computer commands the BP control portion to adjust the actual equalizing reservoir pressure to maintain the actual pressure within the brake pipe at the desired setpoint. The display is then directed to indicate the desired setpoint as the current pressure within the equalizing reservoir.

The method further includes the following steps for those trains that are equipped with brake equipment designed to allow a graduated release of the brakes. After the aforementioned reduction in actual brake pipe pressure has been achieved, the train operator may move the brake handle towards the release position until a value intended for the equalizing reservoir pressure showing in the equalizing reservoir field of the display is at a desired new setpoint above the existing brake pipe pressure. Meanwhile, the computer is directed to command the BP control portion to increase the actual equalizing reservoir pressure to the desired new setpoint thereby causing the actual pressure in the brake pipe to increase accordingly. As the actual brake pipe pressure approaches the desired new setpoint, the computer is directed to command the BP control portion to adjust the actual equalizing reservoir pressure to a value slightly above the desired new setpoint until the actual pressure in the brake pipe reaches the desired new setpoint. While monitoring the actual brake pipe pressure, the computer is directed to command the BP control portion to adjust the actual equalizing reservoir pressure to maintain the actual pressure within the brake pipe at the desired new setpoint. The display is then directed to indicate the desired new setpoint as the current pressure within the equalizing reservoir.

Having now disclosed the invention, it is well within the abilities of one of ordinary skill in the brake control art to codify the improved method in the programming code of the brake control computer. Logic embodying the aforementioned steps need only be incorporated into the software algorithms and control modules involved in the monitoring and regulation of the pressures within the equalizing reservoir and the brake pipe.

The presently preferred embodiment for carrying cut the invention has now been set forth in detail according to the Patent Act. Those persons of ordinary skill in the art to which this invention pertains may nevertheless recognize various alternative ways of practicing the invention without departing from the spirit and scope of the following claims. Those of such skill will also recognize that the foregoing description is merely illustrative and not intended to limit any of the ensuing claims to any particular narrow interpretation.

Accordingly, to promote the progress of science and the useful arts, we secure for ourselves by Letters Patent exclusive rights to all subject matter embraced by the following claims for the time prescribed by the Patent Act.

We claim:

1. A method of controlling pressure within a brake pipe of a train, said train equipped with a brake handle, an equalizing reservoir, a brake pipe control device and a computer for controlling said brake pipe control device according to position of said brake handle, said method comprising the steps of:

(a) providing said computer with a target value for pressure within said equalizing reservoir;

(b) storing in said computer said target value as a setpoint for pressure within said brake pipe;

(c) directing said computer to monitor actual pressure within said brake pipe;

(d) moving said brake handle into a release position when desiring said computer to set said pressure within said equalizing reservoir equal to said setpoint;

(e) directing said computer to command said brake pipe control device to increase actual pressure within said equalizing reservoir to said setpoint thereby causing said actual pressure within said brake pipe to increase;

(f) directing said computer, as said actual pressure within said brake pipe approaches said setpoint, to command said brake pipe control device to adjust said actual pressure within said equalizing reservoir to a value slightly above said setpoint until said actual pressure within said brake pipe reaches said setpoint;

(g) directing, as said computer monitors said actual pressure within said brake pipe, said computer to command said brake pipe control device to adjust said actual pressure within said equalizing reservoir to maintain said actual pressure within said brake pipe at said setpoint;

(h) showing on a display said setpoint as said pressure within said equalizing reservoir rather than said actual pressure contained within said equalizing reservoir;

(i) moving said brake handle away from said release position, when a reduction in said actual pressure in said brake pipe is desired, until a desired value for pressure within said equalizing reservoir showing on said display is at a desired setpoint;

(j) directing said computer to command said brake pipe control device to reduce said actual pressure within said equalizing reservoir to said desired setpoint thereby causing said actual pressure within said brake pipe to reduce;

(k) directing said computer, as said actual pressure within said brake pipe approaches said desired setpoint, to command said brake pipe control device to adjust said actual pressure within said equalizing reservoir to a value slightly below said desired setpoint until said actual pressure within said brake pipe reaches said desired setpoint;

(l) directing, as said computer monitors said actual pressure within said brake pipe, said computer to command said brake pipe control device to adjust said actual pressure within said equalizing reservoir to maintain said actual pressure within said brake pipe at said desired setpoint; and (m) showing on said display said desired setpoint as said pressure within said equalizing reservoir rather than said actual pressure contained within said equalizing reservoir.

2. The method of controlling pressure within a brake pipe as recited in claim 1 wherein said computer monitors said actual pressure within said brake pipe via a transducer.

3. The method of controlling pressure within a brake pipe as recited in claim 1 wherein said computer monitors said actual pressure within said equalizing reservoir via a transducer.

4. The method of controlling pressure within a brake pipe as recited in claim 1 wherein said method is implemented by upgrading a programming code executed by said computer to accommodate said steps of said method.

5. The method of controlling pressure within a brake pipe as recited in claim 1 wherein said target value for pressure within said equalizing reservoir is typically 90 psi for a freight train and typically 110 psi for a passenger train.

6. The method of controlling pressure within a brake pipe as recited in claim 1 further including, for trains equipped to allow graduated release of brakes, the steps of:

(n) moving said brake handle back toward said release position, when said reduction in said actual pressure in said brake pipe has already been accomplished, until an intended value for pressure within said equalizing reservoir showing on said display is at a desired new setpoint above said actual pressure in said brake pipe;

(o) directing said computer to command said brake pipe control device to increase said actual pressure within said equalizing reservoir to said desired new setpoint thereby causing said actual pressure within said brake pipe to increase;

(p) directing said computer, as said actual pressure within said brake pipe approaches said desired new setpoint, to command said brake pipe control device to adjust said actual pressure within said equalizing reservoir to a value slightly above said desired new setpoint until said actual pressure within said brake pipe reaches said desired new setpoint; and (q) directing, as said computer monitors said actual pressure within said brake pipe, said computer to command said brake pipe control device to adjust said actual pressure within said equalizing reservoir to maintain said actual pressure within said brake pipe at said desired new setpoint.

7. The method of controlling pressure within a brake pipe as recited in claim 6 wherein said computer monitors said actual pressure within said brake pipe via a transducer.

8. The method of controlling pressure within a brake pipe as recited in claim 6 wherein said computer monitors said actual pressure within said equalizing reservoir via a transducer.

9. The method of controlling pressure within a brake pipe as recited in claim 6 wherein said method is implemented by upgrading the programming code executed by said computer to accommodate said steps of said method.

10. The method of controlling pressure within a brake pipe as recited in claim 6 wherein said target value for pressure within said equalizing reservoir is typically 90 psi for a freight train and typically 110 psi for a passenger train.

11. The method of controlling pressure within a brake pipe as recited in claim 6 further including, after step (q), the step of:

(r) showing on said display said desired new setpoint as said pressure within said equalizing reservoir rather than said actual pressure contained within said equalizing reservoir.

12. A method of controlling pressure within a brake pipe of a train, said method comprising the steps of:

(a) providing a computer with a target value for pressure within an equalizing reservoir;

(b) storing in said computer said target value as a setpoint for pressure within said brake pipe;

(c) directing said computer to monitor actual pressure within said brake pipe;

(d) moving a brake handle into a release position when desiring said computer to set said pressure within said equalizing reservoir equal to said setpoint;

(e) directing said computer to increase actual pressure within said equalizing reservoir to said setpoint thereby causing said actual pressure within said brake pipe to increase;

(f) directing said computer, as said actual pressure within said brake pipe approaches said setpoint, to adjust actual pressure within said equalizing reservoir to a value slightly above said setpoint until said actual pressure within said brake pipe reaches said setpoint;

(g) directing, as said computer monitors said actual pressure within said brake pipe, said computer to adjust said actual pressure within said equalizing reservoir to maintain said actual pressure within said brake pipe at said setpoint;

(h) moving said brake handle away from said release position, when a reduction in said actual pressure in said brake pipe is desired, until a desired value for pressure within said equalizing reservoir showing on a display is at a desired setpoint;

(i) directing said computer to reduce said actual pressure within said equalizing reservoir to said desired setpoint thereby causing said actual pressure within said brake pipe to reduce;

(j) directing said computer, as said actual pressure within said brake pipe approaches said desired setpoint, to adjust said actual pressure within said equalizing reservoir to a value slightly below said desired setpoint until said actual pressure within said brake pipe reaches said desired setpoint; and (k) directing, as said computer monitors said actual pressure within said brake pipe, said computer to adjust said actual pressure within said equalizing reservoir to maintain said actual pressure within said brake pipe at said desired setpoint.

13. The method of controlling pressure within a brake pipe as recited in claim 12 further including, between steps (g) and (h), the step of:

(a) showing on said display said setpoint as said pressure within said equalizing reservoir rather than said actual pressure contained within said equalizing reservoir; and, after step (k), the step of:

(b) showing on said display said desired setpoint as said pressure within said equalizing reservoir rather than said actual pressure contained within said equalizing reservoir.

14. The method of controlling pressure within a brake pipe as recited in claim 13 wherein said computer monitors said actual pressure within said brake pipe via a transducer.

15. The method of controlling pressure within a brake pipe as recited in claim 13 wherein said computer monitors said actual pressure within said equalizing reservoir via a transducer.

16. The method of controlling pressure within a brake pipe as recited in claim 13 wherein said method is implemented by upgrading a programming code executed by said computer to accommodate said steps of said method.

17. The method of controlling pressure within a brake pipe as recited in claim 13 wherein said target value for pressure within said equalizing reservoir is typically 90 psi for a freight train and typically 110 psi for a passenger train.

18. The method of controlling pressure within a brake pipe as recited in claim 13 wherein said computer controls said actual pressure within said equalizing reservoir via a brake pipe control device according to movement of said brake handle.

19. The method of controlling pressure within a brake pipe as recited in claim 12 further including, for trains equipped to allow graduated release of brakes, the steps of:

(l) moving said brake handle back toward said release position, when said reduction in said actual pressure in said brake pipe has already been accomplished, until an intended value for pressure within said equalizing reservoir showing on said display is at a desired new setpoint above said actual pressure in said brake pipe;

(m) directing said computer to increase said actual pressure within said equalizing reservoir to said desired new setpoint thereby causing said actual pressure within said brake pipe to increase;

(n) directing said computer, as said actual pressure within said brake pipe approaches said desired new setpoint, to adjust said actual pressure within said equalizing reservoir to a value slightly above said desired new setpoint until said actual pressure within said brake pipe reaches said desired new setpoint; and (o) directing, as said computer monitors said actual pressure within said brake pipe, said computer to adjust said actual pressure within said equalizing reservoir to maintain said actual pressure within said brake pipe at said desired new setpoint.

20. The method of controlling pressure within a brake pipe as recited in claim 19 further including, between steps (g) and (h), the step of:

(a) showing on said display said setpoint as said pressure within said equalizing reservoir rather than said actual pressure contained within said equalizing reservoir; and, after step (k), the step of:

(b) showing on said display said desired setpoint as said pressure within said equalizing reservoir rather than said actual pressure contained within said equalizing reservoir; and, after step (o), the step of:

(c) showing on said display said desired new setpoint as said pressure within said equalizing reservoir rather than said actual pressure contained within said equalizing reservoir.

* * * * *